April 14, 1936.  J. SCHAEFER  2,037,595
PROCESS FOR THE PRODUCTION OF CRYSTALS OF SALTS
Filed Aug. 20, 1931
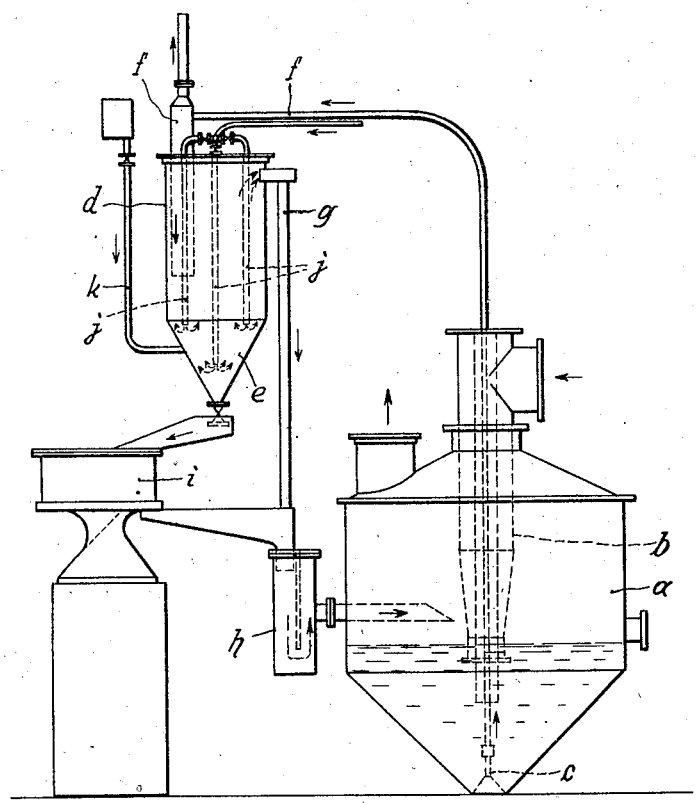
INVENTOR
Josef Schaefer
BY
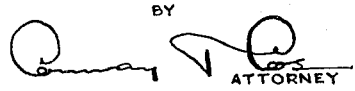
ATTORNEY Patented Apr. 14, 1936

2,037,595

UNITED STATES PATENT OFFICE 2,037,595

PROCESS FOR THE PRODUCTION OF CRYSTALS OF SALTS

Josef Schaefer, Dortmund, Germany, assignor to Collin & Co., Dortmund, Germany

Application August 20, 1931, Serial No. 558,344
In Germany September 25, 1930

2 Claims. (Cl. 23—1)

The invention relates to a process and apparatus for the production of large salt crystals.

In the production of salt crystals of substances contained in gases or liquids in which the gases or liquids are passed through an acid saturator, mostly crystals are obtained which at least partly have only a very small size because of the fact that the acid bath is agitated by the gas or liquid passing therethrough which agitation has an unfavorable influence upon the formation of the crystals. Now the object of the invention is a process and apparatus for the production of substantially large crystals of substances contained in a gas or liquid which is passed through such a saturator. This object is achieved according to the invention by the salt solution being led continuously or periodically from the acid saturator to a collecting vessel from where the solution is led again back to the saturator, a vehicle current being introduced in this collecting vessel which current is capable to carry along with it the small crystals that have been formed in the saturator and to convey them back to the latter. These small crystals when passing anew through the saturator grow up by further congelation and after having reached such a size by one or several passages through the collecting vessel and saturator that the vehicle current is not longer capable to carry them with it from the collecting vessel, these crystals are removed from the vessel at bottom together with the large crystals already deposited therein and the whole quantity of crystals is then delivered to the usual salt centrifugal machine.

Furthermore, an artificial cooling may be provided for the collecting vessel in addition to the cooling effect produced by the natural heat radiation. This increased cooling has the effect that also in the collecting vessel itself a certain growth of the crystals is obtained since the cooling of the solution therein results in a separation of the salt which at least partly deposits on the crystals in the vessel.

Furthermore, if a gaseous agent is made use of as vehicle current for the re-introduction of the small crystals from the collecting vessel in the saturator, this agent has to be supplied under a certain pressure above atmospheric in order to overcome the static pressure prevailing in the vessel and, by expanding then in the latter the vehicle current causes further cooling of the contents of the vessel.

Finally, during the removal of the large salt crystals from the collecting vessel preferably the vehicle current is throttled at least partly so that the opportunity is given, when a neutralization of the salts is desired, to supply a neutralizing means, previous to or during the removal of the salt crystals.

In order that the invention may be clearly understood, an embodiment of an apparatus for carrying the process into effect is diagrammatically illustrated in the accompanying drawing.

In this drawing $a$ denotes an acid saturator to which is supplied in the usual way by means of a dip pipe $b$ the gas or the liquid from which components are to be separated as salt crystals. The saturator $a$ is connected by the salt removing device, such for example as an ejector $c$, to a vessel $d$ which has formed integrally with its lower end a collecting pocket $e$, the connecting pipe $f$ extending into vessel $d$ about to half the depth of the latter. By an overflow pipe $g$ and, if required, a sealing pot $h$ the vessel $d$ is further in connection with the saturator $a$. The lower end of vessel $d$ that means pocket $e$ delivers the large crystals collected therein to a centrifugal salt separator $i$, as shown.

A pipe intended to supply the above-mentioned vehicle current, such for example as compressed air, is provided which pipe is bifurcated so as to form several branch pipes $j$ which project into the vessel $d$ down about to the bottom thereof and advantageously open at different levels. In the embodiment illustrated the longer pipe or pipes $j$ can be shut off from the shorter ones by valves, as shown, so that the vehicle current can be supplied selectively by all branches $j$ or by the said shorter pipes only.

A further pipe $k$ is provided which is intended for the supply of a neutralizing means to vessel $d$.

Furthermore, the vessel $d$ may be equipped with a special device for cooling its contents which cooling device may be of any suitable design known in the art and is therefore not shown by sake of clearness.

The described apparatus operates as follows:

The salt crystals of different size depositing in the acid saturator $a$ are continually or periodically conveyed by the ejector $c$ to the collecting vessel $d$. In the latter the small crystals are driven upwards by the vehicle current fed through the pipes $j$ at the bottom of vessel $d$ and pass with the solution that flows through the overflow pipe $g$ back to the saturator $a$, whilst the large crystals collect in the pocket $e$ from where they are conveyed periodically to the centrifugal machine $i$.

When the crystals are supplied from the saturator $a$ to the collecting vessel $d$ in continuous current, the vehicle current has likewise to be maintained continuously, except the short interruptions during which the salt crystals are withdrawn from pocket e, or the vehicle current is supplied to vessel d during this period of withdrawal only through the short pipes j. Furthermore, during this period of withdrawal of the crystals from pocket e or shortly before a neutralizing means may be fed to the latter through pipe k.

By means of the process and apparatus hereinbefore described for example a saliniform sulphate of ammonium can be produced from gases of distillation of coal, in which 70% of the crystals produced have a grain size of more than 0.5 mm. while at most 2% thereof have a size of less than 0.2 mm.

I claim:

1. A cyclic process for the production of large salt crystals, which comprises forming crystals in an acid saturator in which salt is formed by reaction, conveying a mixture of the crystals and sufficient salt solution to make said mixture fluid, from the acid saturator to a separate vessel where the crystals formed are deposited or become enlarged, separating in said vessel the small crystals from the larger ones by subjecting them while in the liquid menstruum to an upwardly directed gaseous vehicle current, conveying the small crystals back to the acid saturator, further enlarging these small crystals in the acid saturator and withdrawing the large crystals from said separate vessel after they have reached the desired size.

2. A cyclic process for the production of large salt crystals, which comprises forming crystals in an acid saturator in which salt is formed by reaction, conveying a mixture of the crystals and sufficient salt solution to make said mixture fluid, from the acid saturator to an externally cooled separate vessel where the crystals formed are deposited or become enlarged, separating in said vessel the small crystals from the larger ones by subjecting them while in the liquid menstruum to an upwardly directed gaseous vehicle current, conveying the small crystals back to the acid saturator, further enlarging these small crystals in the acid saturator and withdrawing the large crystals from said separate vessel after they have reached the desired size, the supply of said gaseous vehicle current being shut off at least partly from time to time and a neutralizing means for the salt introduced into said separate vessel.

JOSEF SCHAEFER.